US011240417B1

(12) United States Patent
Gurganus

(10) Patent No.: US 11,240,417 B1
(45) Date of Patent: Feb. 1, 2022

(54) DYNAMIC ADJUSTMENT OF IMAGE CAPTURE DEVICE UPLOAD RATE

(71) Applicant: GoPro, Inc., San Mateo, CA (US)

(72) Inventor: Gene Keith Gurganus, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/850,418

(22) Filed: Apr. 16, 2020

(51) Int. Cl.
*H04N 5/232* (2006.01)
*H04N 5/225* (2006.01)
*H04W 4/029* (2018.01)
*H04W 36/32* (2009.01)

(52) U.S. Cl.
CPC ....... *H04N 5/23206* (2013.01); *H04N 5/2252* (2013.01); *H04N 5/2253* (2013.01); *H04N 5/2257* (2013.01); *H04W 4/029* (2018.02); *H04W 36/32* (2013.01)

(58) Field of Classification Search
CPC ............ H04N 5/23206; H04N 5/2253; H04N 5/2252; H04N 5/2257; H04W 36/32; H04W 4/029
See application file for complete search history.

(56) References Cited

U.S. PATENT DOCUMENTS

| 7,239,346 B1* | 7/2007 | Priddy | G06K 9/00885 348/220.1 |
|---|---|---|---|
| 2004/0017310 A1* | 1/2004 | Vargas-Hurlston | H04W 28/18 342/357.4 |
| 2014/0200038 A1* | 7/2014 | Rao | G01C 21/32 455/457 |
| 2015/0341646 A1* | 11/2015 | Sze | H04L 65/4092 375/240.26 |
| 2016/0037304 A1* | 2/2016 | Dunkin | H04W 36/0083 455/456.1 |
| 2018/0343054 A1* | 11/2018 | Barritt | H04L 41/12 |

\* cited by examiner

*Primary Examiner* — Timothy J Henn
(74) *Attorney, Agent, or Firm* — Esplin & Associates, PC

(57) ABSTRACT

Upload bandwidth to a remote device may vary depending on the location of a device transmitting information to the remote device. Location of an image capture device may be used to dynamically change the upload speed from the image capture device to the remote device.

19 Claims, 7 Drawing Sheets

DYNAMIC ADJUSTMENT OF IMAGE CAPTURE DEVICE UPLOAD RATE

FIELD

This disclosure relates to dynamically adjusting upload rate of an image capture device based on location of the image capture device.

BACKGROUND

An image capture device may be streaming content being captured to a remote device. The image capture device streaming information at a rate higher than the available communication bandwidth between the image capture device and the remote device may result in dropped information (e.g., dropped video frames, dropped audio).

SUMMARY

This disclosure relates to image capture devices that dynamically adjust upload rate. An image capture device may include a housing. The housing may carry one or more of an image sensor, an optical element, a location sensor, a transmitter, and/or other components. The optical element may guide light within a field of view to the image sensor. The image sensor may generate a visual output signal conveying visual information defining visual content based on light that becomes incident thereon. The location sensor may generate a location output signal conveying location information of the image capture device. The location information may characterize location of the image capture device. The transmitter may be configured to transmit information to a remote device.

Location-bandwidth information and/or other information may be obtained. The location-bandwidth information may characterize bandwidth of information transfer from a set of locations to the remote device. A predicted future location of the image capture device may be determined based on the location information and/or other information. A predicted bandwidth of information transfer from the predicted future location of the image capture device may be determined based on a match between a location from the set of locations and the predicted future location of the image capture device, and/or other information. A rate of information transfer from the image capture device to the remote device may be set based on the predicted bandwidth of information transfer and/or other information. At least a portion of the visual information may be transmitted, from the predicted future location, based on the rate of information transfer and/or other information.

An electronic storage may store location-bandwidth information, information relating to bandwidth of information transfer from a set of locations to a remote device, information relating to the remote device, information relating to the set of locations, information relating to an image capture device, information relating to predicted future location of the image capture device, information relating to predicted bandwidth of information transfer from the predicted location of the image capture device, information relating to rate of information transfer from the image capture device to the remote device, information relating to transmission of information from the image capture device to the remote device, and/or other information.

The housing may carry one or more components of the image capture device. The housing may carry (be attached to, support, hold, and/or otherwise carry) one or more of an image sensor, an optical element, a location sensor, a transmitter, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The location sensor may be configured to generate a location output signal and/or other output signals. The location output signal may convey location information of the image capture device. The location information may characterize locations of the image capture device. In some implementations, the location sensor may include one or more GPS units used to determine the locations of the image capture device. In some implementations, the location sensor may include one or more GPS units and one or more motion sensors. The GPS unit(s) may be used to determine the locations of the image capture device. The motion sensor(s) may be used to determine direction of motion of the image capture device and/or speed of motion of the image capture device.

The transmitter may be configured to transmit information to a remote device and/or other devices. The transmitter may be configured to transmit information via one or more electromagnetic waves.

The processor(s) may be configured by machine-readable instructions. Executing the machine-readable instructions may cause the processor(s) to facilitate dynamically adjusting upload rate of an image capture device. The machine-readable instructions may include one or more computer program components. The computer program components may include one or more of a location-bandwidth component, a location component, a predicted bandwidth component, a rate component, a transmit component, and/or other computer program components.

The location-bandwidth component may be configured to obtain location-bandwidth information and/or other information. The location-bandwidth information may characterize bandwidth of information transfer between a set of locations and a remote device. The location-bandwidth information may characterize bandwidth of information transfer from the set of locations to a remote device. The location-bandwidth information may characterize bandwidth of information transfer from the remote device to the set of locations. The location-bandwidth information may characterize bandwidth of information transfer from the image capture device and/or other devices to the remote device. The location-bandwidth information may characterize bandwidth of information transfer from the remote device to the image capture device and/or other devices.

In some implementations, the location-bandwidth information may be generated based on previous communication between the image capture device/other devices and the remote device. The image capture device/other device may be location at the set of locations and the remote device may be located at a static location during previous communication between the image capture device/other devices and the remote device.

The location component may be configured to determine a location of the image capture device. The location of the image capture device may be determined based on the location information and/or other information. The location of the image capture device may include a present location of the image capture device, a predicted future location of the image capture device, and/or other locations of the image capture device.

In some implementations, the location sensor may include one or more GPS units used to determine the locations of the image capture device, and the predicted future location of the image capture device may be determined based on changes in the locations of the image capture device. In some implementations, the location sensor may include GPS unit(s) used to determine the locations of the image capture device and motion sensor(s) used to determine direction of motion of the image capture device and/or speed of motion of the image capture device, and the predicted future location of the image capture device may be determined based the locations of the image capture device, the direction of the motion of the image capture device, and the speed of motion of the image capture device.

In some implementations, the predicted future location of the image capture device may be determined further based on route information. The route information may characterize one or more planned routes for motion of the image capture device.

The predicted bandwidth component may be configured to determine a predicted bandwidth of information transfer between the image capture device and the remote device. The predicted bandwidth of information transfer between the image capture device and the remote device may include bandwidth of information transfer that is predicted between the image capture device and the remote device at a future time and/or from a future location. The predicted bandwidth of information transfer between the image capture device and the remote device may include predicted bandwidth of information transfer from the image capture device to the remote device. The predicted bandwidth of information transfer between the image capture device and the remote device may include predicted bandwidth of information transfer from the remote device to the image capture device.

The predicted bandwidth of information transfer between the image capture device and the remote device may be determined based on the location of the image capture device, the location-bandwidth information, and/or other information. The predicted bandwidth of information transfer between the image capture device and the remote device may be determined based on the present location of the image capture device and/or the predicted future location of the image capture device. For example, the predicted bandwidth of information transfer from the predicted future location of the image capture device to the remote device may be determined based on a match between a location from the set of locations and the predicted future location of the image capture device, and/or other information.

In some implementations, the predicted bandwidth of information transfer between the image capture device and the remote device may be determined further based on predicted time of operation of the image capture device. For example, the predicted bandwidth of information transfer from the predicted future location of the image capture device may be determined further based on predicted time of operation of the image capture device.

In some implementations, the predicted bandwidth of information transfer between the image capture device and the remote device may be determined further based on predicted weather condition. For example, the predicted bandwidth of information transfer from the predicted future location of the image capture device may be determined further based on predicted weather condition at the predicted future location.

In some implementation, the predicted bandwidth of information transfer between the image capture device and the remote device may be determined further based on number of devices connected to the remote device. For example, the predicted bandwidth of information transfer from the predicted future location of the image capture device may be determined further based on number of devices transmitting information to the remote device.

The rate component may be configured to set a rate of information transfer between the image capture device and the remote device. The rate of information transfer between the image capture device and the remote device may include a rate of information transfer from the image capture device to the remote device. The rate of information transfer between the image capture device and the remote device may include a rate of information transfer from the remote device to the image capture device. The rate of information transfer between the image capture device and the remote device may be set based on the predicted bandwidth of information transfer between the image capture device and the remote device, and/or other information.

The transmit component may be configured to effectuate transmission of information between the image capture device and the remote device. Information may be transmitted between the image capture device and the remote device based on the rate of information transfer between the image capture device and the remote device. For example, the image capture device may transmit at least a portion of the visual information based on the rate of information transfer from the remote device to the image capture device. The image capture device may transmit at least a portion of the visual information based on the rate of information transfer from the predicted future location and/or other locations. The predicted future location may be associated with the predicted bandwidth of information transfer between the image capture device and the remote device. The image capture device may transmit at least a portion of the visual information based on the rate of information transfer at a future time. The future time may be associated with the predicted bandwidth of information transfer between the image capture device and the remote device.

In some implementations, at least a portion of the visual information may be transmitted based on the rate of information transfer from the predicted future location based on a current location of the image capture device being at the predicted future location or within a threshold distance from the predicted future location. In some implementations, at least a portion of the visual information may be transmitted based on the rate of information transfer from the predicted future location based on passage of time at which the image capture device is expected to be at the predicted future location.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
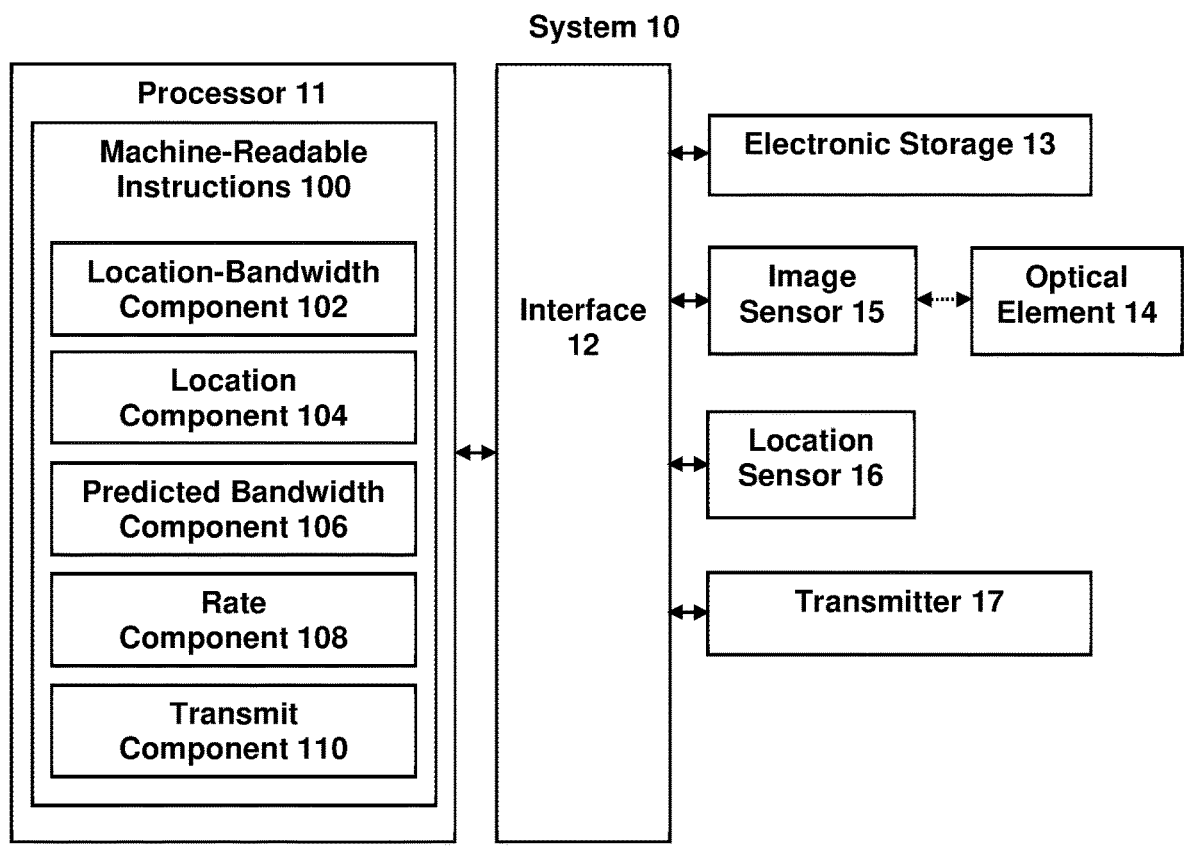
FIG. 1 illustrates an example system that dynamically adjusts upload rate of an image capture device.

FIG. 1 illustrates a system 10 for dynamically adjusts upload rate of an image capture device. The system 10 may include one or more of a processor 11, an interface 12 (e.g., bus, wireless interface), an electronic storage 13, an optical element 14, an image sensor 15, a location sensor 16, a transmitter 17, and/or other components. The system 10 may include and/or be part of an image capture device. The image capture device may include a housing, and one or more of the optical element 14, the image sensor 15, the location sensor 16, the transmitter 17, and/or other components of the system 10 may be carried by the housing the image capture device. The optical element 14 may guide light within a field of view to the image sensor 15. The image sensor 15 may generate a visual output signal conveying visual information defining visual content based on light that becomes incident thereon. The location sensor 16 may generate a location output signal conveying location information of the image capture device. The location information may characterize location of the image capture device. The transmitter 17 may be configured to transmit information to a remote device.

Location-bandwidth information and/or other information may be obtained by the processor 11. The location-bandwidth information may characterize bandwidth of information transfer from a set of locations to the remote device. A predicted future location of the image capture device may be determined by the processor 11 based on the location information and/or other information. A predicted bandwidth of information transfer from the predicted future location of the image capture device may be determined by the processor 11 based on a match between a location from the set of locations and the predicted future location of the image capture device, and/or other information. A rate of information transfer from the image capture device to the remote device may be set by the processor 11 based on the predicted bandwidth of information transfer and/or other information. At least a portion of the visual information may be transmitted by the processor 11, from the predicted future location, based on the rate of information transfer and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store location-bandwidth information, information relating to bandwidth of information transfer from a set of locations to a remote device, information relating to the remote device, information relating to the set of locations, information relating to an image capture device, information relating to predicted future location of the image capture device, information relating to predicted bandwidth of information transfer from the predicted location of the image capture device, information relating to rate of information transfer from the image capture device to the remote device, information relating to transmission of information from the image capture device to the remote device, and/or other information.

Visual content and/or audio content may be captured by an image capture device. Visual content may refer to content of image(s), video frame(s), and/or video(s) that may be consumed visually. Audio content may refer to media content that may be consumed as one or more sounds. Audio content may include one or more sounds stored in one or more formats/containers, and/or other audio content. Audio content may include one or more sounds captured by one or more sound sensors (e.g., microphone).

For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view and/or audio content may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Content captured by an image capture device be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). For example, information defining visual content (visual information) may be stored within a single file or multiple files. Visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, the location sensor 16, the transmitter 17, and/or other components of the system 10 may be carried by the housing of the image capture device.

Figure 3:
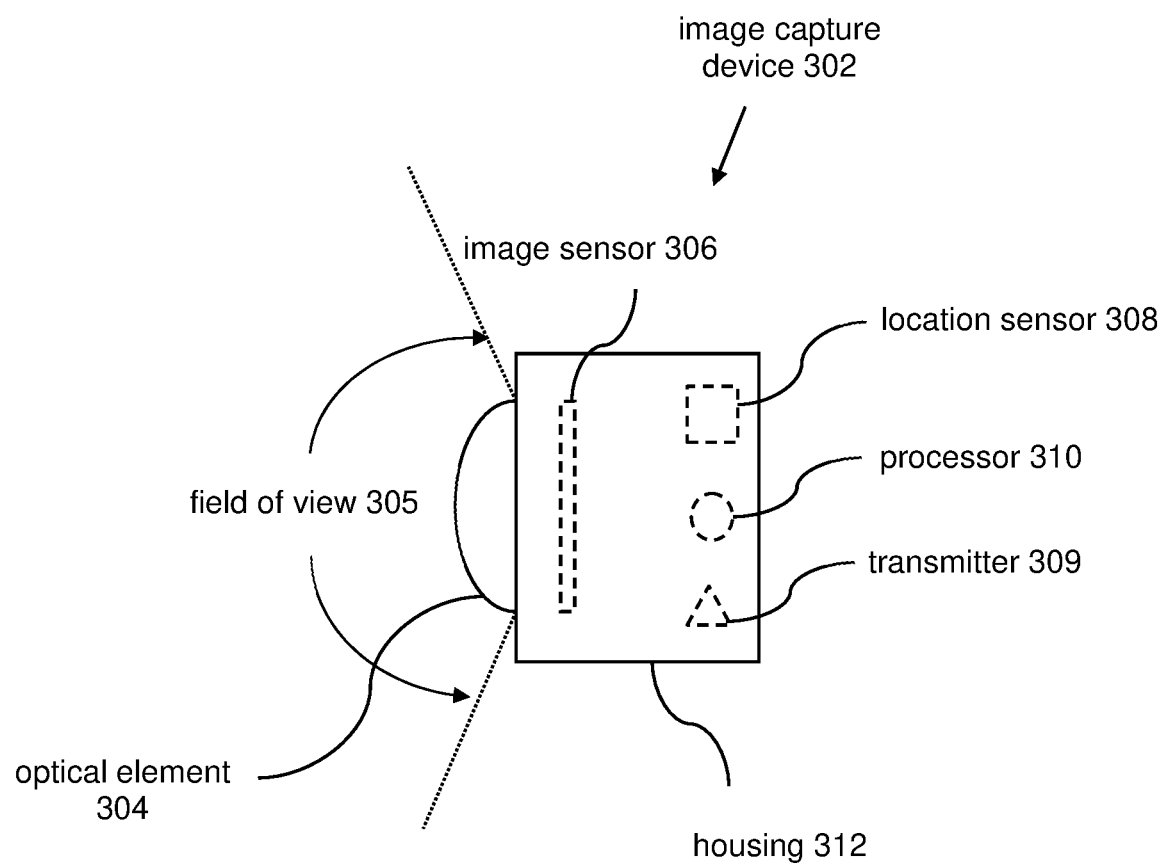
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a location sensor 308, a transmitter 309, a processor 310, and/or other components.

One or more components of the image capture device 302 may be the same as, be similar to, and/or correspond to one or more components of the system 10. For example, he processor 308 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The location sensor 308 may be the same as, be similar to, and/or correspond to the location sensor 16. The transmitter 309 may be the same as, be similar to, and/or correspond to the transmitter 17 16. The housing may carry other components, such as the electronic storage 13. The image capture device 302 may include other components not shown in FIG. 3, such as one or more sound sensors. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semi-conductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The location sensor 308 may include sensor(s) that measures physical location of the image capture device 302. Location of the image capture device 302 may include lateral location (e.g., latitude and longitude coordinates) and/or vertical location (e.g., elevation). The location sensor 308 may generate output signals conveying information that characterizes location of the image capture device 302.

For example, the location sensor 308 may be configured to generate a location output signal and/or other output signals. The location output signal may convey location information of the image capture device 302. The location information may characterize locations of the image capture device 302. The location information may characterize locations of the image capture device by including information that defines one or more of values, qualities, attributes, features, and/or other aspects of the location of the image capture device 302.

In some implementations, the location information may characterize location of the image capture device 302 by describing, defining, and/or otherwise characterizing present location of the image capture device 302. For example, the location sensor 308 may include one or more GPS (global positioning system) units used to determine the locations of the image capture device 302 at different moments (e.g., during capture of visual content, audio content). The GPS unit(s) may receive communication from GPS satellites and use the received communication to calculate (e.g., triangulate) its location.

In some implementations, the location information may characterize location of the image capture device 302 by describing, defining, and/or otherwise characterizing changes in location of the image capture device 302. For example, the location sensor 308 may include one or more GPS (global positioning system) units used to determine the locations of the image capture device 302 at different moments (e.g., during capture of visual content, audio content). Differences in locations of the image capture device 302 at different moments may be used to determine changes in location of the image capture device 302. As another example, the location sensor 308 may include one or more GPS units and one or more motion sensors. The GPS unit(s) may be used to determine the locations of the image capture device 302. The motion sensor(s) may be used to determine direction of motion of the image capture device 302 and/or speed of motion of the image capture device 302. That is, the GPS unit(s) may be used to determine the present location of the image capture device 302, and the motion sensor(s) may be used to determine in what direction(s) (lateral direction, vertical direction, rotational direction) and/or with what speed(s) the image capture device 302 is moving from its location.

A motion sensor may include sensor(s) that measures experienced positions and/or motions. Positions may include rotational positions (orientations) and/or translational positions. Motions may include rotational motions (changes in orientation, tilt, pitch, roll) and/or translational motions (e.g., forward/backward motion, left/right motion, up/down motion). The motion sensor 308 may convert experienced positions and/or motions into output signals. The output signals may include electrical signals. For example, the motion sensor 308 may refer to a set of motion sensors, which may include one or more inertial measurement units, one or more accelerometers, one or more gyroscopes, and/or other motion sensors. The motion sensor 308 may generate output signals conveying information that characterizes positions and/or motions of the motion sensor 308 and/or device(s) carrying the motion sensor 308, such as the image capture device 302 and/or the housing 312.

For example, the motion sensor 308 may be configured to generate a motion output signal based on positions/motion of the image capture device 302 during the capture duration. The motion output signal may convey motion information that characterizes motion experienced by the image capture device 302 at different moments (points in time, time durations) within the capture duration. For example, the motion information that characterizes motion experienced by the image capture device 302 during capture of images by the image capture device 302.

The motion information may characterize motion experienced by the image capture device 302 based on specific translational and/or rotational positions of the image capture device 302 and/or based on changes in translational and/or rotational positions of the image capture device 302 as a function of progress through the capture duration. That is, the motion information may characterize translational and/or rotational positions of the image capture device 302 and/or changes in translational and/or rotational positions of the image capture device 302 (e.g., direction, amount, velocity, acceleration) during the capture duration. The motion information may include rotational motion information characterizing rotational motion of the image capture device 302, translational motion information characterizing translational motion of the image capture device 302, and/or other motion information.

The transmitter 309 may refer to equipment used to generate and/or transmit electromagnetic waves carrying information. The transmitter 309 may be configured to transmit information via the electromagnetic waves. For example, the transmitter 309 may generate and/or transmit information defining content captured by the image capture device 302 and/or other information via the electromagnetic waves. The transmitter 309 may generate and/or transmit electromagnetic waves based on one or more wireless communication technologies, such as cellular communication technology, WiFi and/or Bluetooth.

The transmitter 309 may be configured to transmit information to one or more remote device and/or other devices. A remote device may refer to a device remote or separate from the image capture device 302. A remote device may refer to a device that is physically separated from the image capture device 302. A remote device may refer to a communication device that receives information from the image capture device 302 and/or transmits information to the image capture device 302. For example, a remote device may refer to a computer, a cell site, a cell tower, a cellular base station, a wireless router, a mobile device (e.g., smartphone, tablet, laptop), and/or other devices that communicates with the image capture device 302.

In some implementations, the image capture device 302 may include one or more receivers. A receiver may refer to equipment used to receiver and/or convert electromagnetic waves carrying information. A receiver may be part of or separate from the transmitter 309. A receiver may be configured to receive information via electromagnetic waves. A receiver may receive and/or convert electromagnetic waves based on one or more wireless communication technologies, such as cellular communication technology, WiFi and/or Bluetooth. For example, a receiver may receive and/or convert electromagnetic waves transmitted by one or more remote devices.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the location sensor 308. The processor 310 may facilitate transfer of information from the image sensor 306 and/or the location sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may use geospatial analysis to predict the upload bandwidth to improve the quality of live streaming from the image capture device 302. Geospatial factors, such as location of the image capture device 302, motion (speed and direction) of the image capture device, time of day, weather condition, and/or other geospatial factors, may be analyzed to predict the amount of upload bandwidth from the image capture device 302 to a remote device, and the upload rate of information transmitted from the image capture 302 to the remote device may be adjusted based on the predicted amount of upload bandwidth.

For example, the image capture device 302 may capture content (e.g., visual content, audio content during a capture duration. The image capture device 302 may stream captured content to a remote device. For example, the image capture device 302 may provide live-streaming of content being captured to a remote device. The image capture device 302 may use its location (e.g., current location, speed and/or direction in which the image capture device 302 is moving) to determine (e.g., estimate) amount of bandwidth between the image capture device 302 and the remote device. The image capture device 302 may use its location to determine amount of bandwidth between the image capture device 302 and the remote device at a future location and/or a future time. The image capture device 302 may adjust the rate at which it transmits information to the remote device (e.g., upload rate) based on the amount of bandwidth between the image capture device 302 and the remote device.

In some implementations, adjusting the rate at which it transmits information to the remote device may include the image capture device adjusting the information transmitted to the remote device. For example, the image capture device may change how the information to be transmitted to the remote device is encoded and/or compressed based on the amount of bandwidth between the image capture device 302 and the remote device. For instance, based on the amount of bandwidth between the image capture device 302 and the remote device expected to be lower/decrease at the future location and/or the future time, the image capture device 302 may change how captured content is encoded so that the content captured for transmission is encoded into smaller file(s) (e.g., video frames encoded with lower fidelity, such as lower resolution, lower framerate, and/or lower color bits, to decrease size of video frames). Based on the amount of bandwidth between the image capture device 302 and the remote device expected to be higher/increase at the future location and/or the future time, the image capture device 302 may change how captured content is encoded so that the content captured for transmission is encoded into larger file(s) (e.g., video frames encoded with higher fidelity, such as higher resolution, higher framerate, and/or higher color bits, to increase size of video frames). The encoding of content captured for transmission may be changed before change in bandwidth so that smaller/larger amount of information may be prepared for transmission using the lower/higher bandwidth in the future (e.g., at a predicted future location of the image capture device 302).

Referring back to FIG. 1, the processor 11 (or one or more components of the processor 11) may be configured to obtain information to facilitate detecting hand obstructions. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamically adjusts upload rate of an image capture device. The machine-readable instructions 100 may include one or more computer program components. The machine-readable instructions 100 may include one or more of a location-bandwidth component 102, a location component 104, a predicted bandwidth component 106, a rate component 108, a transmit component 110, and/or other computer program components.

The location-bandwidth component 102 may be configured to obtain location-bandwidth information and/or other information. Obtaining location-bandwidth information may include one or more of accessing, acquiring, analyzing, determining, examining, identifying, loading, locating, opening, receiving, retrieving, reviewing, selecting, storing, and/or otherwise obtaining the location-bandwidth information. The location-bandwidth information component 102 may obtain location-bandwidth information from one or more locations. For example, the location-bandwidth information component 102 may obtain location-bandwidth information from a storage location, such as the electronic storage 13, electronic storage of a device accessible via a network, and/or other locations. The location-bandwidth information component 102 may obtain location-bandwidth information from one or more hardware components (e.g., the remote device) and/or one or more software components (e.g., software running on a computing device).

The location-bandwidth information may characterize bandwidth of information transfer between a set of locations and a remote device. Bandwidth of information transfer may refer to the maximum information transfer rate for the remote device. Bandwidth of information transfer may define/limit how much information may be transmitted over communication with the remote device over a duration of time. Bandwidth of information transfer may reflect how much information may pass through a communication connection (e.g., network connection) to the remote device.

A set of locations may include one or more locations. Different locations within the set of locations may be displaced from each other laterally and/or vertically. For example, a set of locations may include multiple locations having different latitude coordinates, different longitude coordinates, and/or different elevations. The location-bandwidth information may characterize bandwidth of information transfer between one or more computing devices located at the set of location and the remote device. The remote device may be located at a static location. That is, the location of the remote device associated with the location-bandwidth information may not change. The location-bandwidth information may characterize bandwidth of information transfer between one or more computing devices located different locations and the remote device fixed at a location.

The bandwidth of information transfer between a set of locations and a remote device may include bandwidth of information transfer from the set of locations to the remote device, and/or the bandwidth of information transfer from the remote device to the set of locations. For example, the location-bandwidth information may characterize bandwidth of information transfer from the set of locations to a remote device. The location-bandwidth information may characterize bandwidth of information transfer from the remote device to the set of locations. The location-bandwidth information may characterize bandwidth of information transfer from the image capture device and/or other devices to the remote device. The location-bandwidth information may characterize bandwidth of information transfer from the remote device to the image capture device and/or other devices.

In some implementations, the location-bandwidth information may include different sets of information for different conditions in which devices (e.g., image capture device) may communicate with the remote device. Different conditions may include operating conditions, environmental conditions, and/or other conditions that may affect the bandwidth of information transfer between the set of locations and the remote device. For example, conditions that may affect (e.g., increase, decrease) the bandwidth of information transfer between the set of locations and the remote device may include time of communication between device(s) at the set of locations and the remote device, weather condition at the set of locations and/or at the location (static location) of the remote device, and number of devices connected to the remote device (e.g., number of devices transmitting information to and/or receiving information from the remote device), and the location-bandwidth information may include information that characterize bandwidth of information transfer for different time of operation, different weather condition, and/or different number of connected devices. The location-bandwidth information may characterize different bandwidth of information transfer for different time of operation, different weather condition, and/or different number of connected devices. The bandwidth information may characterize bandwidth of information transfer for different locations, and may characterize how different time of operation, different weather condition, and/or different number of connected devices may change (e.g., increase, decrease) the bandwidth of information transfer for different locations.

The location-bandwidth information may characterize bandwidth of information transfer between a set of locations and a remote device by including information that defines one or more of values, qualities, attributes, features, and/or other aspects of the bandwidth of information transfer between the set of locations and the remote device. For example, the location-bandwidth information may characterize bandwidth of information transfer between a set of locations and a remote device by including information that makes up the values of bitrate (e.g., maximum bitrate, ranges of bitrate) for transmitting information from the set of locations to the remote device, or from the remote device to the set of locations. The location-bandwidth information may characterize bandwidth of information transfer between a set of locations and a remote device by including information that may be used to determine the values of bitrate (e.g., maximum bitrate, ranges of bitrate) for transmitting information from the set of locations to the remote device, or from the remote device to the set of locations. Other types of location-bandwidth information are contemplated.

In some implementations, the location-bandwidth information may be generated based on previous communication between the image capture device/other device(s) and the remote device. The image capture device/other device may be located at the set of locations (moving) and the remote device may be located at a static location (not moving) during previous communication between the image capture device/other device(s) and the remote device. The previous communication between the image capture device/other device(s) and the remote device may be used to determine the bandwidth of information transfer between the set of locations and the remote device. In some implementations, the intervals (e.g., time interval, spatial interval) at which bandwidth of information transfer are determined may be set based user selection. For example, a user may set the spatial resolution of the location-bandwidth information so that the shape and/or size of the individual locations are user-defined. For instance, a user may choose the sample rate to determine bandwidth of information transfer between the image capture device/other device(s) and the remote device. The sample rate may be defined spatially (e.g., bandwidth sampling per distance) and/or temporally (e.g., bandwidth sampling per time duration).

For example, a user may be interested in live-streaming capture of video while racing around a racetrack. Before activating live-streaming, the user may go around the racetrack while carrying a device (e.g., an image capture device, other communication devices) that communicates with a remote device to/through which captured video will be live-streamed. The device's communication with the remote device from different locations along the racetrack may be used to determine the bandwidth of information transfer from different locations along the racetrack to the remote device. The location-bandwidth information may be generated to characterize the determined bandwidth of information transfer.

As another example, a user may be interested in live streaming capture of video while walking around a city block. Before user activates live-streaming from an image capture device to a remote device, other device(s) may have communicated with the remote device from different locations around the city block. The device(s)' communication with the remote device from different locations around the city block may be used to determine the bandwidth of information transfer from different locations around the city block to the remote device. The location-bandwidth information may be generated to characterize the determined bandwidth of information transfer. Other generation of location-bandwidth information are contemplated.

Figure 4A:
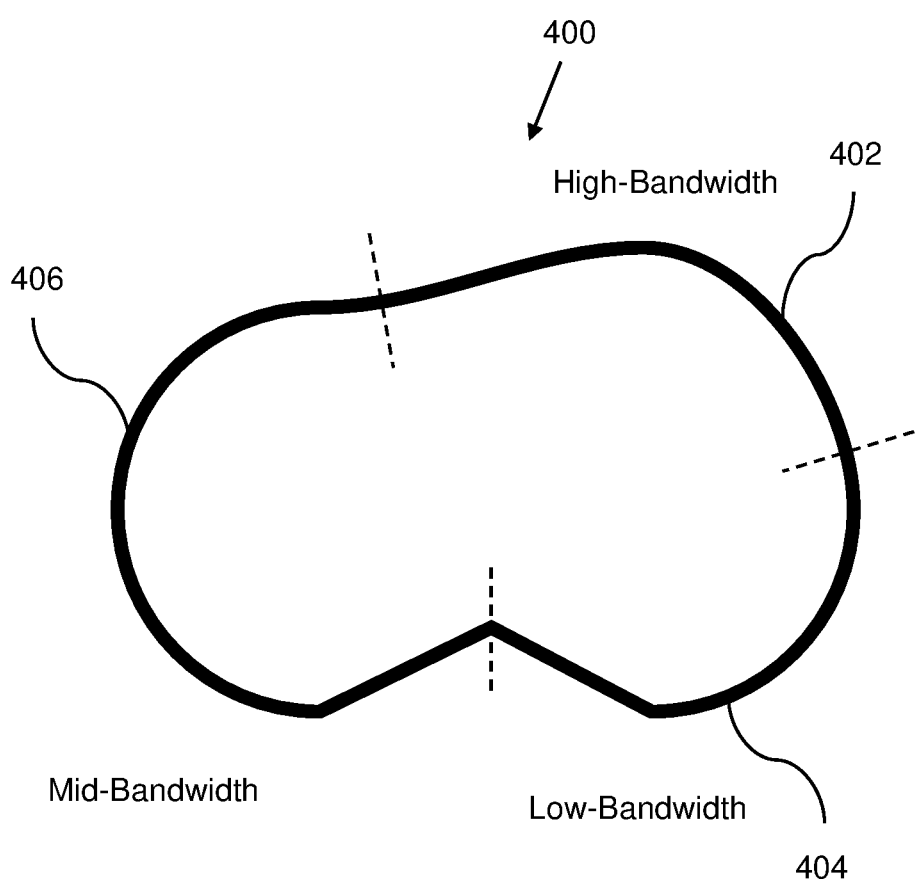
FIG. 4A illustrates an example map of upload rates to a remote device for different locations.

FIG. 4A illustrates an example map 400 of upload rates to a remote device for different locations. The map 400 may include a route including three segments 402, 404, 406. Bandwidth of information transfer from different locations along the route and a remote device may be determined based on communication from the different locations along the route and the remote device. For example, the bandwidth of information transfer from locations along the segment 402 to the remote device may be high, the bandwidth of information transfer from locations along the segment 404 to the remote device may be low, and the bandwidth of information transfer from locations along the segment 406 to the remote device may be middle. A device (e.g., image capture device) transmitting information to the remote device from somewhere along the segment 406 may be able to transmit information at a higher rate than from somewhere along the segment 404. A device (e.g., image capture device) transmitting information to the remote device from somewhere along the segment 406 may be limited to a lower rate than from somewhere along the segment 402.

Figure 4B:
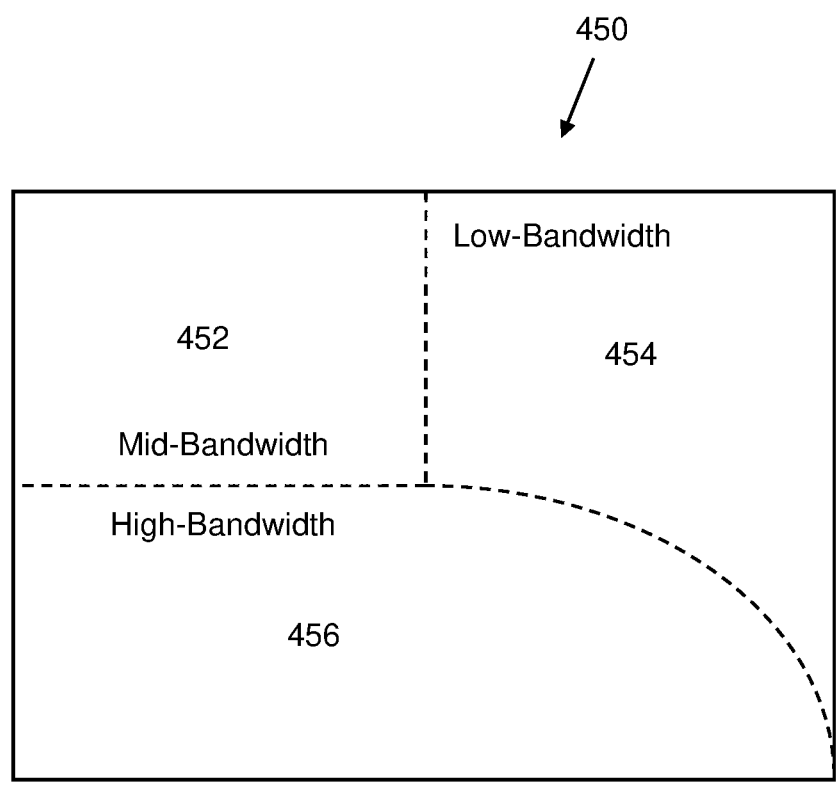
FIG. 4B illustrates an example map of upload rates to a remote device for different locations.

FIG. 4B illustrates an example map 450 of upload rates to a remote device for different locations. The map 450 may include an area including three sub-area 452, 454, 456. Bandwidth of information transfer from different locations within the area and a remote device may be determined based on communication from the different locations within the area and the remote device. For example, the bandwidth of information transfer from locations within the sub-area 452 to the remote device may be middle, the bandwidth of information transfer from locations within the sub-area 454 to the remote device may be low, and the bandwidth of information transfer from locations within the sub-area 456 to the remote device may be high. A device (e.g., image capture device) transmitting information to the remote device from somewhere within the sub-area 456 may be able to transmit information at a higher rate than from somewhere within the sub-area 452. A device (e.g., image capture device) transmitting information to the remote device from somewhere within the sub-area 454 may be limited to a lower rate than from somewhere within the sub-area 452.

The location component 104 may be configured to determine a location of the image capture device. Determining a location of the image capture device may include ascertaining, calculating, establishing, finding, and/or otherwise determining the location of the image capture device. The location of the image capture device may be determined based on the location information and/or other information. For example, the location component 104 may use the location information from the location sensor 16 determine the location of the image capture device. The location of the image capture device determined by the location component 104 may include lateral location (e.g., latitude and longitude coordinates) and/or vertical location (e.g., elevation) of the image capture device.

The location of the image capture device determined by the location component 104 may include a present location of the image capture device, a predicted future location of the image capture device, and/or other locations of the image capture device. A present location of the image capture device may refer to location currently occupied by the image capture device. A present location of the image capture device may refer to location indicated by the location information as being occupied by the image capture device. A predicted future location of the image capture device may refer to a location that is predicted to be occupied by the image capture device in the future. A predicted future location of the image capture device may refer to a location that is determined based on the location information to be occupied by the image capture device in the future.

In some implementations, a predicted future location of the image capture device may be determined based on locations of the image capture device at different times. For example, the location sensor 16 may include one or more GPS units, which may be used to determine the locations of the image capture device at different times. The predicted future location of the image capture device may be determined based on changes in the locations of the image capture device. For instance, distances between locations of the image capture device at different times may be used to calculate speed with which the image capture device is moving, and the orientations of the locations of the image capture device at different times may be used to calculate direction in which the image capture device is moving. The calculated speed and direction of the motion of the image capture device may be used to predict where the image capture device will be located in the future (e.g., at one or more moments in the future).

In some implementations, a predicted future location of the image capture device may be determined based operation of one or more motion sensors. For example, the location sensor 17 may include GPS unit(s) and motion sensor(s). The GPS unit(s) may be used to determine the locations of the image capture device, and the motion sensor(s) may be used to determine direction of motion of the image capture device and/or speed of motion of the image capture device. The predicted future locations of the image capture device may be determined based the locations of the image capture device, the direction of the motion of the image capture device, and the speed of motion of the image capture device. For example, a GPS unit may be used to determine the location of the image capture device at a particular moment. A motion sensor may be used to determine in what direction and with what speed the image capture device is moving at the particular moment. The direction and speed of motion of the image capture device may be used to determine how far and in what direction the image capture device will be located at a future moment from the determined location.

In some implementations, the predicted future location of the image capture device may be determined further based on route information. The route information may characterize one or more planned routes for motion of the image capture device. A planned route may refer to a way, a course, and/or path of travel planned for the image capture device. For example, for a user traveling around a racetrack, the planned route may include the locations covered by the racetrack. The planned routes for the motion of the image capture device may be used to narrow the predicted future location of the image capture device. For example, a predicted future location may be required to be within the planned route and/or within a threshold distance from the planned route. Use of the route information to determine the predicted future location of the image capture device may enable more accurate determination of the predicted future location of the image capture device. In some implementations, the route information may be provided by a user. For example, a user may select the route along which the image capture device is planned to be moved. In some implementations, the route information may be selected based on locations of the image capture device. For example, locations of the image capture device at different times may match locations along a route, and the route information for the route may be used for predicted future location determination.

The predicted bandwidth component 106 may be configured to determine a predicted bandwidth of information transfer between the image capture device and the remote device. Determining a predicted bandwidth of information transfer between the image capture device and the remote device may include ascertaining, calculating, establishing, finding, and/or otherwise determining the predicted bandwidth of information transfer between the image capture device and the remote device.

A predicted bandwidth of information transfer may refer to the maximum information transfer rate that is predicted between the image capture device and the remote device. A predicted bandwidth of information transfer may refer to the maximum information transfer rate that is predicted between the image capture device and the remote device at a future location (e.g., predicted future location) and/or at a future time. A predicted bandwidth of information transfer may predict how much information may be transmitted from the image capture device over communication with the remote device over a duration of time. A predicted bandwidth of information transfer may reflect how much information is predicated to be able to pass through a communication connection (e.g., network connection) between the image capture device and the remote device.

A predicted bandwidth of information transfer between the image capture device and the remote device may include bandwidth of information transfer that is predicted between the image capture device and the remote device at a future time and/or from a future location. A predicted bandwidth of information transfer between the image capture device and the remote device may include predicted bandwidth of information transfer from the image capture device to the remote device (e.g., predicated upload rate). The predicted bandwidth of information transfer between the image capture device and the remote device may include predicted bandwidth of information transfer from the remote device to the image capture device (e.g., predicated download rate).

The predicted bandwidth of information transfer between the image capture device and the remote device may be determined based on the location of the image capture device, the location-bandwidth information, and/or other information. The predicted bandwidth of information transfer between the image capture device and the remote device may be determined based on the present location of the image capture device and/or the predicted future location of the image capture device. For example, the location of the image capture device (e.g., present location, predicted future location) may be used to select at least one of the bandwidth of information transfer characterized by the location-bandwidth information as the predicted bandwidth of information transfer between the image capture device and the remote device. The predicted bandwidth of information transfer between the image capture device and the remote device may be determined by adjusting at least one of the bandwidth of information transfer characterized by the location-bandwidth information based on the location of the image capture device.

For example, present location of the image capture device, as well the direction and speed of motion of the image capture device may be used to select/adjust a bandwidth of information transfer from the location-bandwidth information as the predicted bandwidth of information transfer between the image capture device and the remote device. As another example, the predicted bandwidth of information transfer from the predicted future location of the image capture device to the remote device may be determined based on a match between a location from the set of locations of the location-bandwidth information and the predicted future location of the image capture device, and/or other information. The location-bandwidth information may provide the bandwidth of information transfer from different locations to the remote device, and the predicted bandwidth of information transfer between the image capture device and the remote device may selected as the bandwidth of information transfer of the location that matches the predicted future location of the image capture device.

In some implementations, the predicted future location of the image capture device may match a location of the location-bandwidth information based on the two locations being the same location. In some implementations, the predicted future location of the image capture device may match a location of the location-bandwidth information based on the two locations having one or more overlaps. In some implementations, the predicted future location of the image capture device may match a location of the location-bandwidth information based on one of the locations being within the other location. In some implementations, the predicted future location of the image capture device may match a location of the location-bandwidth information based on the locations being within threshold distance of each other. Other matching between the predicted future location of the image capture device and the location of the location-bandwidth information are contemplated.

In some implementations, the predicted bandwidth of information transfer between the image capture device and the remote device may be determined further based on predicted time of operation of the image capture device. The predicted time of operation of the image capture device may refer to a time at which the image capture device is predicted to transmit information to the remote device, and/or vice versa. The predicted time of operation of the image capture device may refer to a time at which the image capture device is predicted to be at the predicted future location. For example, the predicted bandwidth of information transfer from the predicted future location of the image capture device may be determined further based on predicted time of operation of the image capture device. For instance, the location-bandwidth information may provide different bandwidth of information transfer from the predicted future location for different operation times (e.g., higher bandwidth during the day, lower bandwidth during the night). The predicted bandwidth of information transfer between the image capture device and the remote device may be determined by selecting the bandwidth of information transfer that matches the predicted time of operation of the image capture device. The location-bandwidth information may provide information on how the bandwidth of information transfer from the predicted future location changes for different operation times (e.g., increase bandwidth by a certain amount during a certain time of day, decreasing bandwidth by a certain amount during a certain time of night). The predicted bandwidth of information transfer between the image capture device and the remote device may be determined by adjusting the bandwidth of information transfer at the predicted future location to take into account differences in bandwidth available at different times.

In some implementations, the predicted bandwidth of information transfer between the image capture device and the remote device may be determined further based on predicted weather condition. The predicted weather condition may refer to weather condition that is predicted when the image capture device transmits information to the remote device, and/or vice versa. The predicted weather condition may refer to weather condition that is predicated when the image capture device is at the predicted future location. For example, the predicted bandwidth of information transfer from the predicted future location of the image capture device may be determined further based on predicted weather condition at the predicted future location. For instance, the location-bandwidth information may provide different bandwidth of information transfer from the predicted future location for different weather conditions (e.g., cloud coverage, wind speed, precipitation amount, rain vs hail vs snow). The predicted bandwidth of information transfer between the image capture device and the remote device may be determined by selecting the bandwidth of information transfer that matches the predicted weather condition. The location-bandwidth information may provide information on how the bandwidth of information transfer from the predicted future location changes for different weather conditions. The predicted bandwidth of information transfer between the image capture device and the remote device may be determined by adjusting the bandwidth of information transfer at the predicted future location to take into account differences in bandwidth available during different weather conditions.

In some implementation, the predicted bandwidth of information transfer between the image capture device and the remote device may be determined further based on number of devices connected to the remote device. Devices connected to the remote device may include devices transmitting information to and/or receiving information from the remote device. For example, the predicted bandwidth of information transfer from the predicted future location of the image capture device may be determined further based on number of devices transmitting information to the remote device. Larger number of devices transmitting information to the remote device may result in smaller bandwidth, while smaller number of devices transmitting information to the remote device may result in larger bandwidth. For instance, the location-bandwidth information may provide different bandwidth of information transfer from the predicted future location for different number of devices connected to the remote device. The predicted bandwidth of information transfer between the image capture device and the remote device may be determined by selecting the bandwidth of information transfer that matches the number of devices currently connected to the remote device and/or the number of devices predicted to be connected to the remote device. The location-bandwidth information may provide information on how the bandwidth of information transfer from the predicted future location changes for different number of devices connected to the remote device. The predicted bandwidth of information transfer between the image capture device and the remote device may be determined by adjusting the bandwidth of information transfer at the predicted future location to take into account differences in bandwidth available with different number of devices connected to the remote device.

Figure 5A:
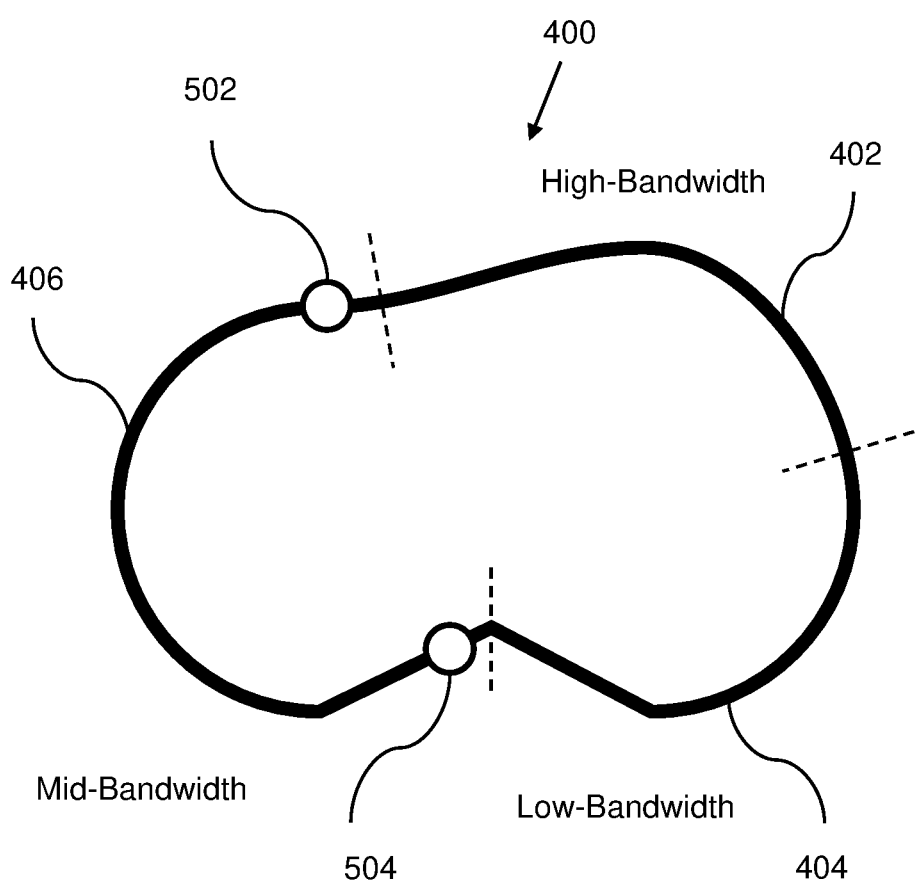
FIG. 5A illustrates an example scenario in which image capture devices communicate with a remote device.

FIG. 5A illustrates an example scenario in which image capture devices 502, 504 communicate with a remote device. The image capture devices 502, 504 may be moving along the route including three segments 402, 404, 406. Different bandwidth of information transfer to the remote device may exist from different locations along the route. The image capture devices 502, 504, while located in the segment 406, may have mid-bandwidth of information transfer to the remote device. The image capture device 502 may be moving towards the segment 402, while the image capture device 504 may be moving towards the segment 404. Based on location and movement of the image capture device 502, the image capture device 502 may be predicted to move into the higher-bandwidth segment 402. The predicted bandwidth of information transfer between the image capture device 502 and the remote device (while inside the higher-bandwidth segment 402) may be larger than the present bandwidth of information transfer between the image capture device 502 and the remote device. Based on location and movement of the image capture device 504, the image capture device 504 may be predicted to move into the lower-bandwidth segment 404. The predicted bandwidth of information transfer between the image capture device 504 and the remote device (while inside the lower-bandwidth segment 404) may be smaller than the present bandwidth of information transfer between the image capture device 502 and the remote device.

Figure 5B:
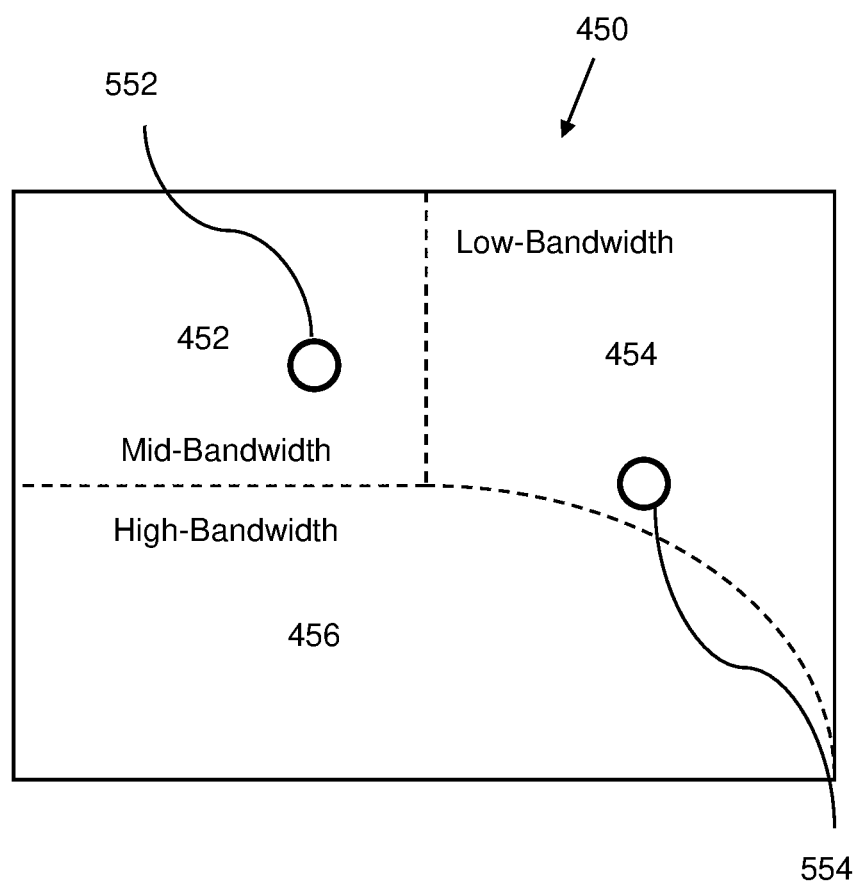
FIG. 5B illustrates an example scenario in which image capture devices communicate with a remote device.

FIG. 5B illustrates an example scenario in which image capture devices 552, 554 communicate with a remote device. The image capture devices 552, 554 may be moving within an area including three sub-areas 452, 454, 456. Different bandwidth of information transfer to the remote device may exist from different locations within the area. The image capture device 552, while located in the sub-area 452, may have mid-bandwidth of information transfer to the remote device. The image capture device 554, while located in the sub-area 454, may have low-bandwidth of information transfer to the remote device. The image capture device 552 may be moving towards the sub-area 454 while the image capture device 554 may be moving towards the sub-area 456.

Based on location and movement of the image capture device 552, the image capture device 552 may be predicted to move into the lower-bandwidth sub-area 454. The predicted bandwidth of information transfer between the image capture device 552 and the remote device (while inside the lower-bandwidth sub-area 454) may be smaller than the present bandwidth of information transfer between the image capture device 552 and the remote device. Based on location and movement of the image capture device 554, the image capture device 554 may be predicted to move into the higher-bandwidth sub-area 456. The predicted bandwidth of information transfer between the image capture device 554 and the remote device (while inside the higher-bandwidth sub-area 456) may be larger than the present bandwidth of information transfer between the image capture device 554 and the remote device. The magnitude of change in the predicted bandwidth of information transfer from present bandwidth of information transfer may be larger for the image capture device 554 (traveling from the low-bandwidth sub-area 454 to the high-bandwidth sub-area 456) than for the image capture device 552 (traveling from the mid-bandwidth sub-area 452 to the low-bandwidth sub-area 454).

The rate component 108 may be configured to set a rate of information transfer between the image capture device and the remote device. Setting a rate of information transfer between the image capture device and the remote device may include ascertaining, determining, establishing, finding, causing, and/or otherwise setting the rate of information transfer between the image capture device and the remote device. Setting the rate of information transfer between the image capture device and the remote device rate may include setting the rate of information transfer between the image capture device and the remote device to a particular value, increasing the value of the rate of information transfer between the image capture device and the remote device, decreasing the value of the rate of information transfer between the image capture device and the remote device, and/or maintaining the value of the rate of information transfer between the image capture device and the remote device.

The rate of information transfer may refer to a rate at which information is transferred from one device to another device. The rate of information transfer between the image capture device and the remote device may include a rate of information transfer from the image capture device to the remote device (image capture device upload rate). The rate of information transfer between the image capture device and the remote device may include a rate of information transfer from the remote device to the image capture device (image capture device download rate). The rate of information transfer between the image capture device and the remote device may include a targeted rate of information transfer between the image capture device and the remote device. The rate of information transfer between the image capture device and the remote device may include a minimum rate and/or a maximum rate of information transfer between the image capture device and the remote device.

The rate of information transfer between the image capture device and the remote device may be set based on the predicted bandwidth of information transfer between the image capture device and the remote device, and/or other information. The predicted bandwidth of information transfer between the image capture device and the remote device may be used as a guide to dynamically change the rate of information transfer and prevent overflow of information. For example, the predicted bandwidth of information transfer between the image capture device and the remote device may be used as a guide to dynamically change the upload rate of the image capture device in streaming captured content to the remote device, and prevent overflow of information transfer, thereby avoiding dropped information (e.g., dropped video frames, dropped audio).

The rate of information transfer between the image capture device and the remote device may be set based on the predicted bandwidth of information transfer between the image capture device and the remote device so that the rate of information transfer between the image capture device and the remote device does not exceed the predicted bandwidth of information transfer. The rate of information transfer between the image capture device and the remote device may be set so that the rate of information transfer increases with larger predicted bandwidth of information transfer and decreases with smaller predicted bandwidth of information transfer. The rate of information transfer between the image capture device and the remote device may be set as a fraction of the predicted bandwidth of information transfer between the image capture device. Other setting of the rate of information transfer between the image capture device and the remote device are contemplated.

In some implementations, setting a rate of information transfer between the image capture device and the remote device may include determining types of information to be transferred between the image capture device and the remote device. Information types to be transferred may be selected based on the rate of information transfer set by the rate component 108. Different types of information may have different sizes and/or different transfer rate requirements. For example, different types of information to be transferred between the image capture device and the remote device may include differently compressed/encoded information defining content captured by the image capture device. Type(s) of information with higher size/higher upload rate requirement may be selected for transfer based on higher rate of information transfer between the image capture device and the remote device. Type(s) of information with smaller size/smaller upload rate requirement may be selected for transfer based on smaller rate of information transfer between the image capture device and the remote device.

In some implementations, different types of information to be transferred between the image capture device and the remote device may be prepared in advance for the change in rate of information transfer between the image capture device and the remote device. For example, based on the rate of information transfer between the image capture device and the remote device increasing in the future, type(s) of information with higher size/higher upload rate requirement may be prepared (e.g., generated) for transfer using the higher rate of information transfer between the image capture device and the remote device in the future. Based on the rate of information transfer between the image capture device and the remote device decreasing in the future, type(s) of information with smaller size/smaller upload rate requirement may be prepared (e.g., generated) for transfer using the higher rate of information transfer between the image capture device and the remote device in the future. Such preparation of information may enable continuous transfer of information without delay and/or overflow. For example, such preparation of information may enable live-streaming of content from the image capture device to the remote device without dropped video frames and/or dropped audio.

For instance, the image capture device may upload to the remote device information defining higher fidelity version of visual content and/or audio content captured by the image capture device when transmitting with higher rate of information transfer, and the image capture device may upload to the remote device information defining lower fidelity version of visual content and/or audio content captured by the image capture device when transmitting with lower rate of information transfer. The image capture device may change how it encodes and/or compresses information defining captured content based on the rate of information transfer between the image capture device and the remote device. The image capture device may change how it encodes and/or compresses information defining captured content based on the rate of information transfer between the image capture device and the remote device in the future (e.g., at a predicted future location of the image capture device). For instance, the image capture device may use higher quality encoding (e.g., resulting in larger file size with higher quality video, and higher upload rate requirement) when the predicted bandwidth of information transfer between the image capture device and the remote device is high, and the image capture device may use lower quality encoding (e.g., resulting in smaller file size with lower quality video, and higher upload rate requirement) when the predicted bandwidth of information transfer between the image capture device and the remote device is low. Thus, in addition to dynamically adjusting rate with which information is transferred by the image capture device based on predicted bandwidth of information transfer between the image capture device and the remote device, the image capture device may prepare/generate information for transfer differently based on the predicted bandwidth of information transfer between the image capture device and the remote device.

The transmit component 110 may be configured to effectuate transmission of information between the image capture device and the remote device. Information may be transmitted between the image capture device and the remote device based on the rate of information transfer between the image capture device and the remote device. Information may be transmitted between the image capture device and the remote device in accordance with the rate of information transfer between the image capture device and the remote device. That is, the information may be transmitted using the rate of information transfer set by the rate component 108. The transmission of information between the image capture device and the remote device may be effectuated using the transmitter 17.

For example, the image capture device may transmit at least a portion of the visual information (defining visual content captured by the image capture device) based on the rate of information transfer from the remote device to the image capture device. The image capture device may transmit information defining some of all of the visual content captured by the image capture device using the upload rate set by the rate component 108.

The image capture device may transmit at least a portion of the visual information based on the rate of information transfer from the predicted future location and/or other locations. The predicted future location may be associated with the predicted bandwidth of information transfer between the image capture device and the remote device. For example, the predicted future location may be associated with the predicted maximum upload rate for the image capture device to transmit information to the remote device. While the image capture device is at the predicted future location, the image capture device may transmit information to the remote device using the upload rate set by the rate component 108 (e.g., the upload rate set based on the predicted maximum upload rate).

The image capture device may transmit at least a portion of the visual information based on the rate of information transfer at a future time. The future time may be associated with the predicted bandwidth of information transfer between the image capture device and the remote device. For example, the future time of image capture device operation may be associated with the predicted maximum upload rate for the image capture device to transmit information to the remote device. When the operating time of the image capture device reaches or nears the future time associated with the predicted maximum upload rate, the image capture device may transmit information to the remote device using the upload rate set by the rate component 108 (e.g., the upload rate set based on the predicted maximum upload rate).

In some implementations, information (e.g., at least a portion of the visual information) may be transmitted by the image capture device based on the rate of information transfer from the predicted future location responsive to a current location of the image capture device being at the predicted future location or within a threshold distance from the predicted future location. For example, the image capture device may use the upload rate set by the rate component 108 to stream captured content to the remote device when the image capture device reaches the predicted future location. The image capture device may use the upload rate set by the rate component 108 to stream captured content to the remote device when the image capture device comes within a threshold distance from the predicted future location.

In some implementations, information (e.g., at least a portion of the visual information) may be transmitted based on the rate of information transfer from the predicted future location based on passage of time at which the image capture device is expected to be at the predicted future location. That is, the image capture device may be expected to be at the predicted future location after moving for a duration of time from its current location. The image capture device may be assumed to be at the predicted location based on the passage of the duration of time, and the image capture device may use the upload rate set by the rate component 108 to stream captured content to the remote device after the passage of the duration of time.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
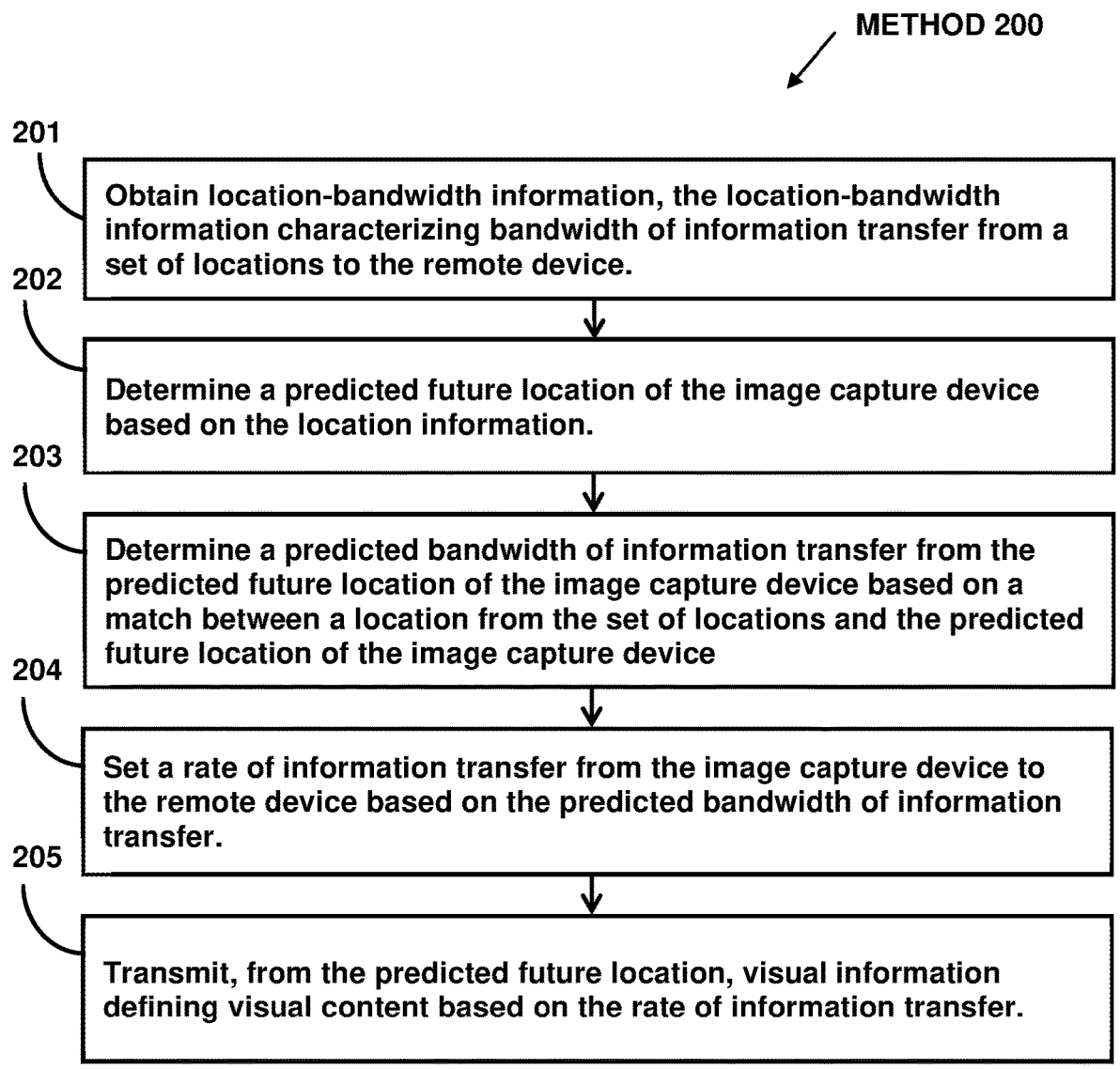
FIG. 2 illustrates an example method for dynamically adjusting upload rate of an image capture device.

FIG. 2 illustrates method 200 for dynamically adjusting upload rate of an image capture device. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a location sensor, a transmitter, and/or other components. The optical element may guide light within a field of view to the image sensor. The image sensor may generate a visual output signal conveying visual information defining visual content based on light that becomes incident thereon. The location sensor may generate a location output signal conveying location information of the image capture device. The location information may characterize location of the image capture device. The transmitter may be configured to transmit information to a remote device.

At operation 201, location-bandwidth information and/or other information may be obtained. The location-bandwidth information may characterize bandwidth of information transfer from a set of locations to the remote device. In some implementation, operation 201 may be performed by a processor component the same as or similar to the location-bandwidth component 102 (Shown in FIG. 1 and described herein).

At operation 202, a predicted future location of the image capture device may be determined based on the location information and/or other information. In some implementations, operation 202 may be performed by a processor component the same as or similar to the location component 104 (Shown in FIG. 1 and described herein).

At operation 203, a predicted bandwidth of information transfer from the predicted future location of the image capture device may be determined based on a match between a location from the set of locations and the predicted future location of the image capture device, and/or other information. In some implementations, operation 203 may be performed by a processor component the same as or similar to the predicted bandwidth component 106 (Shown in FIG. 1 and described herein).

At operation 204, a rate of information transfer from the image capture device to the remote device may be set based on the predicted bandwidth of information transfer and/or other information. In some implementations, operation 204 may be performed by a processor component the same as or similar to the rate component 108 (Shown in FIG. 1 and described herein).

At operation 205, at least a portion of the visual information defining the visual content may be transmitted, from the predicted future location, based on the rate of information transfer and/or other information. In some implementations, operation 204 may be performed by a processor component the same as or similar to the transmit component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for dynamically adjusting upload rate, the image capture device comprising:
    a housing;
    an image sensor carried by the housing and configured to generate a visual output signal conveying visual information based on light that becomes incident thereon, the visual information defining visual content;
    an optical element carried by the housing and configured to guide light within a field of view to the image sensor;
    a location sensor carried by the housing and configured to generate a location output signal conveying location information of the image capture device, the location information characterizing locations of the image capture device;
    a transmitter carried by the housing and configured to transmit information to a remote device; and
    one or more physical processors carried by the housing, the one or more physical processors configured by machine-readable instructions to:
        obtain location-bandwidth information, the location-bandwidth information characterizing bandwidth of information transfer from a set of locations to the remote device, wherein the location-bandwidth information is generated by the one or more physical processors based on previous communication between the image capture device at the set of locations and the remote device at a static location, wherein the bandwidth of information transfer from the set of locations to the remote device is determined by the one or more physical processors at an interval set based on user selection;
        determine a predicted future location of the image capture device based on the location information;
        determine a predicted bandwidth of information transfer from the predicted future location of the image capture device based on a match between a location from the set of locations and the predicted future location of the image capture device;
        change how the visual content currently being captured by the image capture device is encoded by the image capture device for transmission from the predicted future location based on the predicted bandwidth of information transfer such that a lower fidelity encoding is used for the visual content based on a lower value of the predicted bandwidth of information transfer and a higher fidelity encoding is used for the visual content based on a higher value of the predicted bandwidth of information transfer; and
        effectuate transmission, from the predicted future location, of the visual content encoded based on the predicted bandwidth of information transfer.

2. The image capture device of claim 1, wherein the interval set based on the user selection includes a time interval that defines a bandwidth sampling rate per a time duration.

3. The image capture device of claim 1, wherein the interval set based on the user selection includes a spatial interval that defines a bandwidth sampling rate per a distance.

4. The image capture device of claim 1, wherein the predicted future location of the image capture device is determined by the one or more physical processors further based on route information, the route information characterizing a planned route for motion of the image capture device.

5. The image capture device of claim 1, wherein the predicted bandwidth of information transfer from the predicted future location of the image capture device is determined by the one or more physical processors further based on predicted time of operation of the image capture device.

6. The image capture device of claim 5, wherein the predicted bandwidth of information transfer from the predicted future location of the image capture device is determined by the one or more physical processors further based on predicted weather condition at the predicted future location.

7. The image capture device of claim 6, wherein the predicted bandwidth of information transfer from the predicted future location of the image capture device is determined by the one or more physical processors further based on number of devices transmitting information to the remote device.

8. The image capture device of claim 1, wherein the transmission of the visual content encoded based on the predicted bandwidth of information transfer is effectuated by the one or more physical processors from the predicted future location based on a current location of the image capture device being at the predicted future location or within a threshold distance from the predicted future location.

9. The image capture device of claim 1, wherein the transmission of the visual content encoded based on the predicted bandwidth of information transfer is effectuated by the one or more physical processors from the predicted future location based on passage of time at which the image capture device is expected to be at the predicted future location.

10. A method for dynamically adjusting upload rate of an image capture device, the image capture device including one or more processors, an image sensor, an optical element, a location sensor, and a transmitter, the image sensor configured to generate a visual output signal conveying visual information based on light that becomes incident thereon, the visual information defining visual content, the optical element configured to guide light within a field of view to the image sensor, the location sensor configured to generate a location output signal conveying location information of the image capture device, the location information characterizing locations of the image capture device, the transmitter configured to transmit information to a remote device, the method comprising:
    obtaining location-bandwidth information, the location-bandwidth information characterizing bandwidth of information transfer from a set of locations to the remote device, wherein the location-bandwidth information is generated based on previous communication between the image capture device at the set of locations and the remote device at a static location, wherein the bandwidth of information transfer from the set of locations to the remote device is determined by the one or more processors at an interval set based on user selection;

determining a predicted future location of the image capture device based on the location information;

determining a predicted bandwidth of information transfer from the predicted future location of the image capture device based on a match between a location from the set of locations and the predicted future location of the image capture device;

changing how the visual content currently being captured by the image capture device is encoded by the image capture device for transmission from the predicted future location based on the predicted bandwidth of information transfer such that a lower fidelity encoding is used for the visual content based on a lower value of the predicted bandwidth of information transfer and a higher fidelity encoding is used for the visual content based on a higher value of the predicted bandwidth of information transfer; and transmitting, from the predicted future location, the visual content encoded based on the predicted bandwidth of information transfer.

11. The method of claim 10, wherein the location sensor includes a GPS unit and a motion sensor, the GPS unit used to determine the locations of the image capture device, the motion sensor used to determine direction of motion of the image capture device and speed of motion of the image capture device, and the predicted future location of the image capture device is determined based the locations of the image capture device, the direction of the motion of the image capture device, and the speed of motion of the image capture device.

12. The method of claim 10, wherein the predicted future location of the image capture device is determined further based on the route information, route information characterizing a planned route for motion of the image capture device.

13. The method of claim 10, wherein the predicted bandwidth of information transfer from the predicted future location of the image capture device is determined further based on predicted time of operation of the image capture device.

14. The method of claim 13, wherein the predicted bandwidth of information transfer from the predicted future location of the image capture device is determined further based on predicted weather condition at the predicted future location.

15. The method of claim 14, wherein the predicted bandwidth of information transfer from the predicted future location of the image capture device is determined further based on number of devices transmitting information to the remote device.

16. The method of claim 10, wherein the visual content encoded based on the predicted bandwidth of information transfer is transmitted from the predicted future location based on a current location of the image capture device being at the predicted future location or within a threshold distance from the predicted future location.

17. The method of claim 10, wherein the visual content encoded based on the predicted bandwidth of information transfer is transmitted from the predicted future location based on passage of time at which the image capture device is expected to be at the predicted future location.

18. The method of claim 10, wherein the interval set based on the user selection includes a time interval that defines a bandwidth sampling rate per a time duration.

19. The method of claim 10, wherein the interval set based on the user selection includes a spatial interval that defines a bandwidth sampling rate per a distance.

* * * * *